June 1, 1971   J. F. HERUBEL   3,581,336
MACHINE FOR BONING THE FORE QUARTERS OF BUTCHER'S MEAT
Filed April 12, 1968   11 Sheets-Sheet 6

June 1, 1971 J. F. HERUBEL 3,581,336
MACHINE FOR BONING THE FORE QUARTERS OF BUTCHER'S MEAT
Filed April 12, 1968 11 Sheets-Sheet 9

United States Patent Office 3,581,336
Patented June 1, 1971

3,581,336
MACHINE FOR BONING THE FORE QUARTERS OF BUTCHER'S MEAT
Jean Frédéric Herubel, 1 Rue du 4 Fevrier,
Guebwiller, Haut-Rhin, France
Filed Apr. 12, 1968, Ser. No. 720,953
Claims priority, application France, Apr. 14, 1967,
102,746; Feb. 29, 1968, 141,791
Int. Cl. A22c *17/04*
U.S. Cl. 17—1
34 Claims

ABSTRACT OF THE DISCLOSURE

This invention relates to machines for removing the bones from the forequarters of butcher's meat, of the type comprising a support fitted with means for fixing the quarter of meat to be boned and a thin-edged tool which is capable of moving relatively to the said support at least in one longitudinal direction with respect to the direction of the ribs of the meat quarter in such a manner as to engage between the ribs and the meat in order to separate this latter from the bones.

The machine according to the invention comprises a tool support on which are mounted in aligned and adjacent relation a plurality of tools consisting of elongated blades or spatulas having a bevelled front extremity which is not a cutting edge, the said tool support being provided with means for imparting to each of the said spatulas at least one rapid longitudinal reciprocating movement of small amplitude and being additionally provided with one pair of superposed horizontal rollers for stripping the ribs in the vicinity of the extremities of the said spatulas, the meat-quarter support and the tool support being mounted in such a manner as to be capable of relative displacement under the action of suitable means both in the horizontal direction and vertical direction in order that the tools should follow the longitudinal curvature of the ribs of the meat quarter.

This invention relates to machines for removing the bones from the forequarters of butcher's meat, of the type comprising a meat-quarter support fitted with means for fixing thereon the quarter of meat to be boned and a thin-edged tool which is capable of moving relatively to the said support at least in one longitudinal direction with respect to the direction of the ribs of the meat quarter in such a manner as to engage between the ribs and the meat in order to separate this latter from the ribs.

The arm of the invention is to provide a machine of this type which is of simple constructional design and performs neat work at high speed.

To this end, the machine in accordance with the invention comprises a tool support on which are mounted in aligned and adjacent relation a plurality of tools consisting of elongated blades or spatulas each having a bevelled front extremity which is not a cutting edge, the said tool support being provided with means for imparting to each of the said spatulas rapid longitudinal reciprocating movement of small amplitude and being additionally provided with one pair of superposed, i.e. upper and lower horizontal rollers for stripping meat from the ribs in the vicinity of the extremities of the said spatulas, the meat-quarter support and the tool support being mounted in such a manner as to be capable of relative displacement under the action of suitable means both in the horizontal direction and vertical direction in order that the tools should follow the longitudinal curvature of the ribs of the meat quarter.

In one advantageous embodiment the movement of each spatula has in addition to the rapid longitudinal small amplitude reciprocation movements further rapid small amplitude movements substantially at right-angles to the longitudinal movements such that the extremity of the spatula describes a curve whose active portion extends both forwards and upwards in order to detach the meat from the bones in a more effective manner whilst the inactive or return portion of the said curve extends backwards and downwards.

In a particular form of construction which has been devised for the purpose of improving the speed and quality of the work, the means for actuating the spatulas on their support both in the longitudinal direction and a direction normal thereto are such that the movements of any one spatula are out of step with respect to the corresponding movements of the adjacent spatulas; in addition, the edges of the lateral spatula faces which are in contact with each other are sharp edges so as to constitute virtual scissor-blades for the purpose of cutting through any nerve fibres which might still connect the meat to the bones.

In a simple form of construction, the quarter of meat is presented to the spatulas with the ribs located on the underside. But, progressively as the meat is detached by the said spatulas, the meat must then move forward in rubbing contact with the top surfaces of the said spatulas, that is to say while encountering a certain amount of resistance resulting from the friction thus developed, which constitutes a disadvantage.

In order to overcome this disadvantage, it is proposed to present the quarter of meat to the spatulas with the ribs located on top so that the meat which is stripped away by the spatulas has a tendency to fall directly under the action of gravity as it moves away from the underfaces of the spatulas and is no longer in rubbing contact therewith, thus facilitating the removal of the meat from the ribs.

In this machine, the backbone is removed by means of a rotary cutter which shaves or planes and thus wears away the backbone and is designed to work on the underside of the meat quarter, the ribs of which are directed downwards. While it is an advantage to place the meat with the ribs uppermost in order to detach the meat by means of the spatulas, it is nevertheless preferable for the purpose of cutting the backbone to ensure that the ribs are located on the underside in order that the bone sawdust and shavings produced by the rotary cutter should be suitably carried away from the meat quarter and fall under gravity. For the purpose of cutting the backbone, it is therefore desirable to ensure that the ribs are located on the underside of the quarter whereas, for the purpose of meat removal by the spatulas, it is preferable to ensure that the ribs are located uppermost.

To this end, and in accordance with another feature of the invention, the meat quarter support which is provided with means for fixing the meat quarter is so designed and arranged as to be capable of taking up two separate positions, namely: a first position wherein the meat quarter is presented to the rotary cutter so as to effect the removal of the backbone with the ribs located in the underside, and a second position of presentation of the quarter to the stripping rollers and spatulas, with the ribs located uppermost.

By virtue of this particular arrangement, each of the two operations of backbone removal by cutting and of meat removal by means of the spatulas is carired out under the most favourable conditions.

In an advantageous embodiment, the meat quarter support is adapted to move about a horizontal shaft disposed transversely between the frame which carries the rotary cutter for removal of the backbone and the frame which carries the stripping rollers and the spatulas.

In a particular form of construction, the movable support for the meat quarter comprises a table and, in addition to a system for clamping the quarter on the table, a cross-member for supporting the ribs and a clamping cross-member so that the portion of a meat quarter which is located in overhung position beyond the said table is clamped between the said cross-members.

A better understanding of the invention will be gained from the following description and from the accompanying drawings in which a few embodiments of a machine according to the invention for boning the fore-quarters of butcher's meat are shown by way of example and not in any sense by way of limitation.

The machine for boning the forequarters of butcher's meat as shown diagrammatically in FIGS. 1 to 4 comprises a base-plate 1 on which are mounted two main frames, namely: a frame 2 for supporting forequarters 3 of meat to be boned, and a frame 4 which supports the tools.

The frame 2 is a stationarily mounted on the baseplate 1 and its upper portion forms a horizontal rectangular table 7 on which the meat quarter 3 can be fixed by any suitable means such as, for example, the suction-cup clamping system which is generally designated by the reference 8 and subjected to the action of a pneumatic jack 11 carried by a support bracket 12 mounted on top of the table 7. In the following description, the "front" portion of the machine will be understood to mean the section which comprises the table 7.

The other frame 4 is carried by four wheels 14, 15, 16, 17. Said wheels rest on two parallel rails 18, 19 which are fixed on the top face of the base-plate 1 in directions parallel to the short sides of the table 7, with the result that the said frame 4 can move either towards or away from the meat-carrier frame 2, and more especially towards or away from the long rear side of the table 7.

The displacements of the frame 4 along the rails 18, 19, are carried out by means of a reversible electric motor 22 which is carried by the tool-supporting frame 4. The electric motor 22 is coupled by means of a drive system to the axle 23 which is rigidly fixed to the wheels 16 and 17. The said drive system comprises a reduction-gear unit 24 whose output shaft is fitted with a pinion 25 in meshing relation with a pinion 26 which is fixed on the wheel axle 23.

A support 31 having the shape of a yoke is fixed on top of the frame 4. There is mounted between the arms of the said yoke a horizontal shaft 32 which serves as a pivot-pin for a hub 33 which is rigidly fixed to a tool-support plate 34. One extremity of the said plate is fitted with a downwardly-extending arm 35, the lower extremity of which is fitted with a spindle 29 on which is mounted a follower-wheel 36 which is adapted to run along the top of a cam 37 which is rigidly fixed to the base-plate 1 and the profile of which corresponds to that of the ribs 38 of the meat quarter, as can be seen in particular in FIG. 1.

Figure 2:
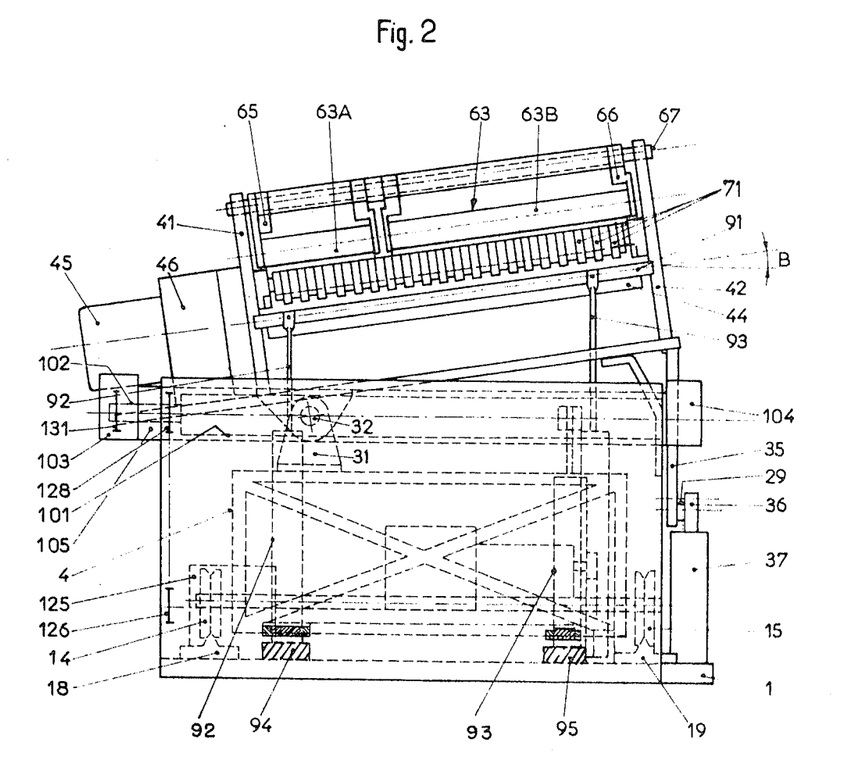
FIG. 2 is a front view of the machine, it being assumed that the meat quarter and the device for fixing or clamping the meat quarter have been removed.
Figure 3:
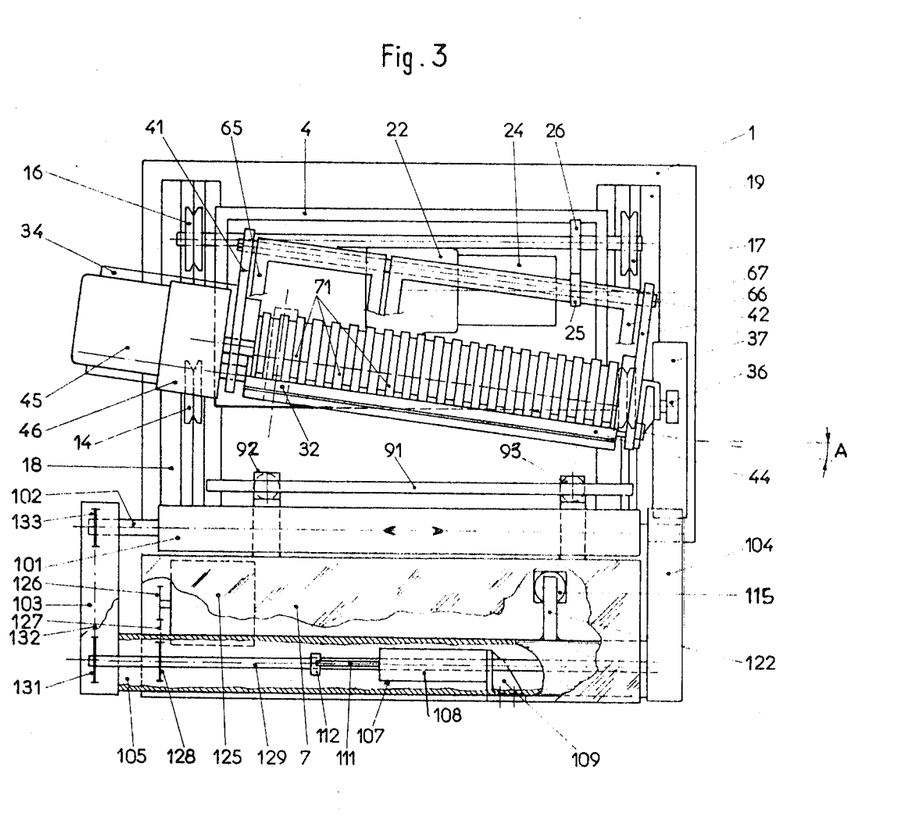
FIG. 3 is a plan view corresponding to FIG. 2, also with portions taken away.
Figure 4:
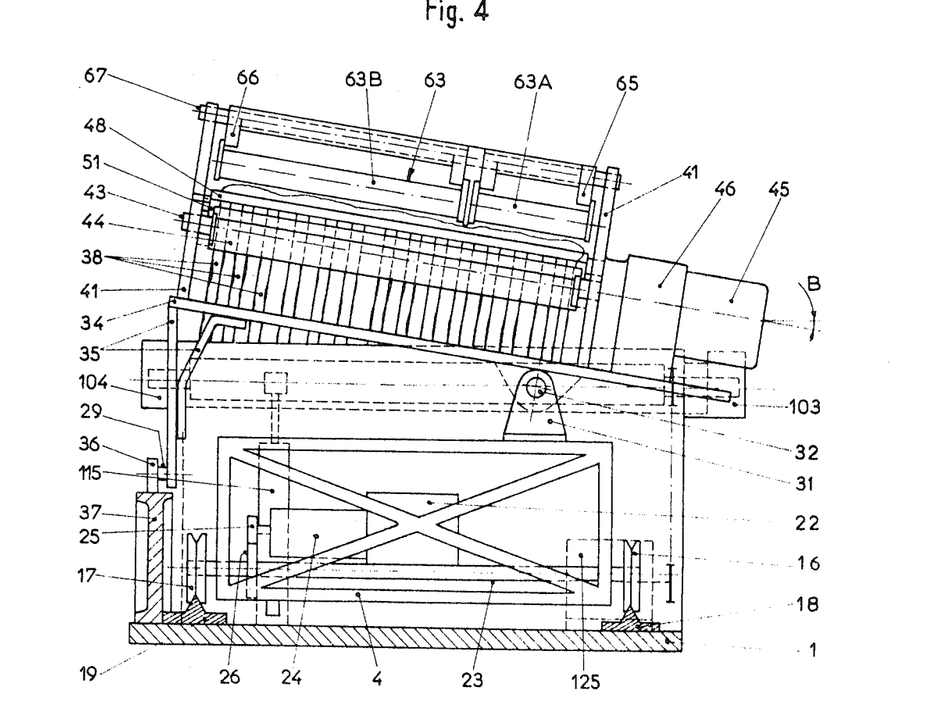
FIG. 4 is a rear view of the machine.

From the plan view of FIG. 3, it will be observed that the general direction of the support plate 34 makes an acute angle A with the direction of the rear edge of the table 7 and that in its top position shown in the drawings, the said support plate is also inclined to the horizontal at an acute angle B (as shown in FIGS. 2 and 4). This arrangement has been adopted in order to take account of the fact that the general configuration of a meat forequarter becomes progressively thinner from one end to the other.

There are fixed on the support plate 34 two endplates 41, 42 between which is rotatably mounted a shaft 43 which is adapted to carry a rib-milling cylindrical cutter 44 which is driven in rotation from an electric motor 45 by means of a reduction-gear unit 46 and a suitable drive system (not shown in the drawings). The electric motor 45 and its reduction-gear unit 46 are also fixed on the support plate 34 externally with respect to the pivot-pin 32 of the support plate so that their combined weights should serve as a counterpoise for the remainder of the support plate and components carried by this latter.

There is also rotatably mounted between the two endplates 41 and 42 an upper stripping roller 48 which is also driven in rotation from the electric motor 45 and its reduction-gear unit 46 by means of a suitable drive system (which has not been shown in the drawings). A freely-rotatable lower stripping roller 51 is adapted to cooperate with the upper stripping roller 48. Each extremity of the said lower roller is rotatably mounted in one extremity of one arm of a two-arm lever such as 52 which is pivotally mounted on a pin 53 carried by the corresponding endplate such as 41. A helical compression spring 56 is applied at one end against a bracket 57 which is attached to the end-plate 41 whilst the other end of the said spring is applied against the extremity of the other arm of the lever 52, with the result that the lower stripping roller 51 is urged upwards elastically against the upper stripping roller 48.

Figure 1:
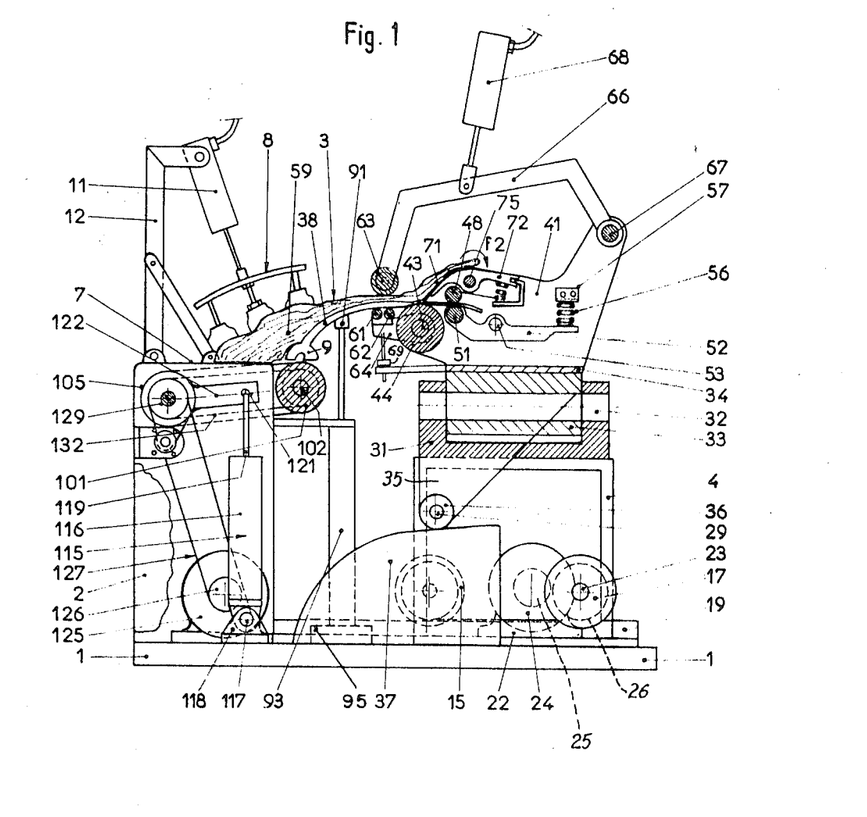
FIG. 1 is a side view showing a first embodiment of a complete machine with some portions thereof taken away and a meat quarter in place therein.

A device for effecting the height-adjustment of the ribs 38 and of the meat 59 is constituted by two lower guide-rollers 61, 62 and an upper pressure roller 63. The ends of the two lower rollers 61, 62 are rotatably mounted in two cheeks such as the cheek 64 (as shown in FIG. 1) which is pivotally mounted on the corresponding extremity of the shaft 43 of the cutter 44. A jack system (not shown in the drawings) makes it possible to bring the said cheeks into their top working position as shown in the drawing, or alternatively into a lower inoperative position in which the said cheeks and the rollers 61, 62 are withdrawn below the cutter 44.

The upper roller 63 is formed of a number of sections, namely two sections 63A and 63B (FIGS. 2 and 4) which, as shown in the example, are rotatably mounted between the arms of two yokes 65, 66 which are pivotally mounted on a pin 67, the two extremities of which are fixed respectively in the two end-plates 41, 42.

The yokes 65, 66 and consequently the roller 63 are urged downwards by a pneumatic jack system 68 so that the said roller 63 is applied against the meat 59 and presses the ribs 38 against the two lower rollers 61, 62.

Figure 5:
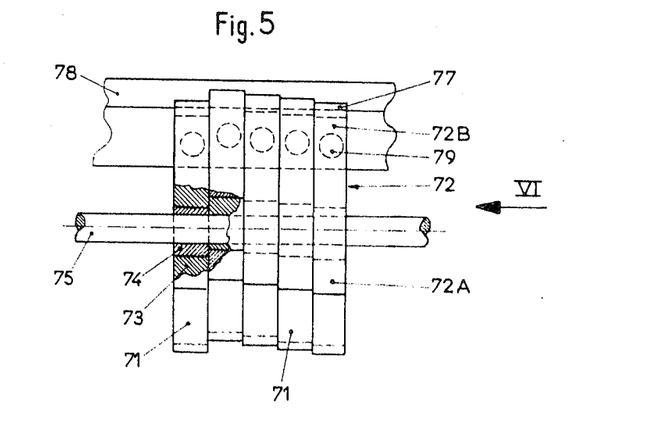
FIG. 5 is a plan view, on a larger scale, showing a set of tools of the machine.
Figures 6, 7, 14, 15:
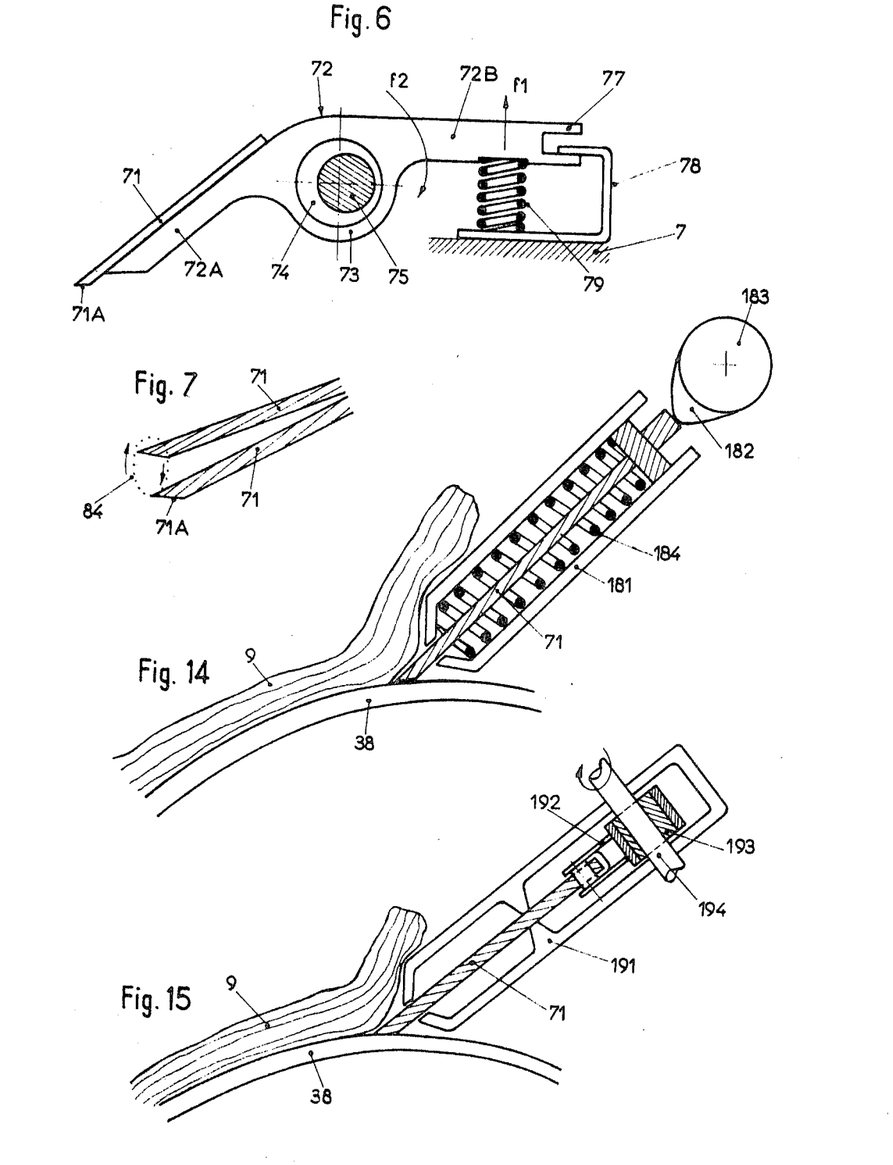
FIG. 6 is a side view on a still larger scale looking in the direction of the arrow VI of FIG. 5.
FIG. 7 shows diagrammatically the path followed by the tip of a tool.
FIGS. 14 to 17 are side views on a larger scale showing different alternative forms of construction of tools.

In the example which is illustrated, the tools are constituted by elongated metal blades 71 of rectangular cross-section (as also shown in FIGS. 5 and 6) which form spatulas and are fixed on juxtaposed levers 72 so that the said spatulas are placed in adjacent and contiguous relation.

Each lever 72 has two arms 72A, 72B (as shown in FIG. 6) which make an obtuse angle with each other; the central portion of each lever which forms a hub 73 is mounted on an eccentric ring 74 fixed on a shaft 75 which is also intended to be driven in continuous rotational motion from the electric motor 45 and reduction-gear unit 46.

Each spatula 71 is secured to the front arm 72A of the corresponding lever 72 whilst the rear arm 72B of each of the said levers has the shape of a fork 77, the said fork being engaged over the edge of a guide 78, the extremities of which are secured to the two end-plates 41, 42. The distance between the two arms of the fork 77 is greater than the thickness of the guide 78 in order that the lever 72 should be capable of oscillating slightly as a function of local variations in thickness of the ribs 38. A helical compression spring 79 is interposed between each arm 72B and the base of the guide 78 in order to cause the corresponding lever 72 to pivot in the direction of the arrow *f1*, thereby applying the front edge of the spatula 71 against the ribs 38.

The levers 72 could be mounted by means of their hubs 73 directly on eccentric portions of the shaft 75 but it proves more convenient in practice to interpose eccentric rings such as the ring 74, particularly by reason of the fact that the movement of each tool must be displaced in phase with respect to the movement of adjacent tools.

Figure 8:
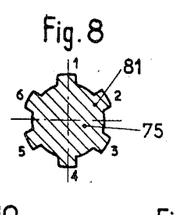
FIG. 8 is a view in cross-section of the tool supporting and actuating shaft in a first form of construction.
Figure 9:
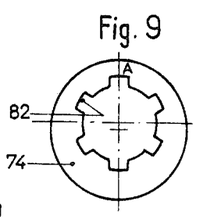
FIG. 9 is a front view of an eccentric ring for connecting a tool to the shaft of FIG. 8.

To this end and in accordance with a solution shown in FIGS. 8 and 9, the shaft 75 is a splined shaft which comprises, for example, six identical and uniformly spaced splines 81, each eccentric ring 74 being provided with a bore in which are formed corresponding female splines 82. All the eccentric rings are identical so that, by setting the rings together on the splined shaft 75 and displacing each ring by 60° with respect to the preceding ring, the desired phase-displacement of the tool movements is automatically obtained.

Figure 10:
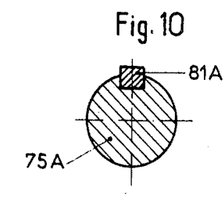
FIG. 10 is a view in cross-section showing another form of construction of a tool supporting and actuating shaft.
Figure 11:
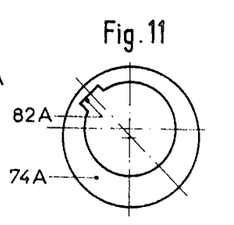
FIGS. 11 and 12 show the structural design of the eccentric rings for supporting two adjacent tools on the shaft of FIG. 10.
Figure 12:
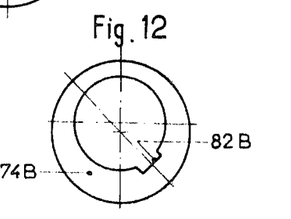

In FIGS. 10 to 12, there is shown an alternative form in which the shaft 75A comprises a single key 81A and each eccentric ring such as 74A or 74B, for example, is provided with a single key groove 82A or 82B which is positioned differently with respect to the line through the centres of the arches defined by the interior and exterior surfaces of the ring; although this solution entails the need for a number of different rings, the key-type shaft is nevertheless less costly to produce than a splined shaft.

The front end of each spatula 71 is bevelled as shown at 71A in FIG. 6 but this bevelled end is not a cutting edge. As a contrast, the lateral faces of the spatulas 71 which are in contact with each other are provided with sharp edges in order that the lateral faces of two adjacent spatulas should form virtual scissor-blades for the purpose of cutting the nerve fibres.

When the shaft 75 is driven in rotation in the direction of the arrow *f2* (as shown in FIGS. 1 and 6), the extremity of each spatula 71 describes a curve of the type shown in dotted-lines at 84 in FIG. 7.

In order to support the meat quarter temporarily, a cross-member 91 (shown in FIGS. 1 to 3) is carried at both extremities respectively by the piston rods of two jacks 92, 93, the cylinders of which are secured to the base-plate 1 at their lower ends by means of footing-blocks 94 and 95.

The top face of the cross-member 91 is serrated in order to engage in the underfaces of the ribs 38 in an effective manner.

A sliding rotary cylindrical cutter 101 is rigidly fixed to a shaft 102, the two extremities of which are rotatably mounted respectively in the free extremities of two lateral arms 103, 104, the two other extremities of which are rigidly fixed to the two extremities of a tube 105 which is capable of pivoting and sliding axially in the top portion of the stationary frame 2.

The axial sliding motion of the tube 105 is carried out by means of a pneumatic jack 107, the cylinder 108 of which is secured to the front vertical wall of the stationary frame 2 by means of a right-angled support bracket 109 whilst the free end of its piston rod 111 is coupled to the said tube 105 by means of a universal joint 112. The jack is supplied through a suitable distribution system which is adapted to impart an axial reciprocating movement to the jack piston and consequently to the tube 105 and the cutter 101.

The pivotal movement of the tube 105 is carried out under the action of another pneumatic jack 115 (FIGS. 1 and 3) and the cylinder 116 of the said jack is pivoted by means of a pin 117 in a yoke 118 which is fixed on the base-plate 1 whilst the free extremity of its piston rod 119 is pivoted by means of a pin 121 on the extremity of an arm 122 which is rigidly fixed to the tube 105. Thus, the sliding rotary cutter 101 can be either raised or lowered by means of the jack 115.

The sliding rotary cylindrical cutter 101 is driven in rotation from an electric motor 125 by means of a drive system which comprises a pulley 126 fixed on the shaft of the motor 125, a driving belt 127 which passes over the said pulley, a pulley 128 which is made fast for rotation with a longitudinal shaft 129, the said shaft being adapted to rotate within the tube 105 in coaxial relation with this latter and the driving belt 127 being also passed over the said pulley 128 through an opening formed in the tube 105, another pulley 131 fixed on one extremity of the shaft 129 within the arm 103 which is accordingly of hollow construction in the embodiment shown, a driving belt 132 which passes over the pulley 131 and another pulley 133 which is rigidly fixed to the shaft 102 of the sliding rotary cutter and over which the driving belt 132 is also passed.

It would obviously be possible to replace the belt-drive system referred-to above by any other suitable driving means such as chains or gears, for example.

The operation of the machine is a follows:

The moving frame 4 which carries the tools being rearwardly displaced to its end position, the sliding rotary cutter 101 being in the lowermost position as a result of retraction of the jack 115, and the serrated cross-member 91 being in the top position and inclined to the horizontal as shown in FIG. 2 the meat forequarter 3 (FIG. 7) to be boned is placed on the table 7 and on the rib-supporting serrated cross-member 91 in such a manner that the backbone 9 is located substantially parallel to the rear edge of the table and above the sliding rotary cutter 101. The said quarter is fixed or clamped on the table by means of the clamping device 8 under the action of the jack 11.

When the motor 125 for driving the sliding rotary cutter 101 in rotation has been started up, the said cutter is moved upwards by means of the jack 115 so that the cutter comes into contact with the backbone 9, removes the said backbone and disengages the ribs 38 with respect to each other. The rotary cutter 101 is moved downwards under the action of the jack 115. The guide rollers 61, 62 are then moved upwards if they are not already in their top position, the motor 45 is started-up for driving the rib-milling cutter 44, the upper stripping roller 48 and the shaft 75 which actuates the spatulas 71 for detaching the meat. The motor 22 is also started-up in the direction which produces the forward displacement of the movable frame 4. The ends of the ribs 38 and the meat 59 which are already in position engage between the lower guide-rollers 61 and 62 and the upper pressure roller 63. Then, under the action of the forward motion of the moving frame 4, the ends of the ribs reach the cutter 44; this latter reduces the thickness of the ribs and removes the membranous tissue which covers the internal faces of the ribs. At the same time, the tips of the spatulas 71 detach the meat from the ends of the ribs which are suitably guided between the rollers 61, 62 and 63. The meat passes over the spatulas whilst the ribs engage between the stripping rollers 48 and 51 which facilitate the meat-removal operation.

As the frame is moving on its rails, the detached meat progresses over the top faces of the spatulas 71 and levers 72 whilst the ribs pass between the stripping rollers 48, 51.

When the operation has been well started, the guide rollers 61, 62 are withdrawn below the rib-calibrating cutter 44, the pressure roller 63 is lifted by means of the jack 68 and the ribbed cross-member 91 is lowered again. Thus, progressively as the moving frame 4 moves forward, the cutter 44 does not encounter any obstacles and can reach the zone in which the backbone 9 was located since the sliding rotary cutter 101 has been moved back to the bottom position as soon as its work has been completed. During the forward motion of the moving frame 4, the follower-wheel 36 has run along the top of the cam 37 and caused the support plate 34 to pivot about its horizontal pin 32, with the result that the rib-milling cutter 44, the stripping cylinders 48 and 51, and all the spatulas 71 have closely followed the rib profile which is reproduced on the cam 37. The approximate constancy of configuration of any meat forequarter and the relative flexibility of this latter make it possible by means of a cam 37 of average profile to perform a bone-removal operation under very good conditions without requiring any adjustment from one quarter to the next.

It will be noted that, by virtue of the presence firstly of the rollers 61, 62, 63 and secondly of the stripping rollers 48, 51, the top rib-faces take up a very precise position; the front extremities of the spatulas 71 are located directly on the said faces and the composite movement of the bevelled edge 71A of each spatula results in effective detachment of the meat 59 from the bones 38. Boning including separation of meat from bones is therefore performed with precision and therefore both neatly and cleanly. Any nerve fibres which might still connect the meat to the bones are cut off by the knife-edges formed by the contiguous spatulas as stated earlier.

The movement of the bevelled ends of the spatulas is obtained by the combination of the movement of each lever 72 (FIG. 6) imparted by the eccentric rings 74 and the coupling provided by the fork 77. The eccentric ring produces the small backward and forward movements as well as up-and-down movements whilst the fork 77 serves to place the spatula in a suitable work position. The play between the fork 77 and the guide 78 permits each spatula to move upwards until the upper arm of the fork comes into contact with the guide, especially when the bones exhibit surface deformations.

The spatula is intended to follow such deformations since it must then move down onto the bone, scrape the bone as it moves forward, lift the meat and detach it from the bone during this upward movement and return to its position of engagement during its rearward movement.

The bevelled end of each spatula is not a cutting edge by reason of the fact that it is not intended to cut the bone but only to scrape this latter in order to detach the meat therefrom.

Figure 13:
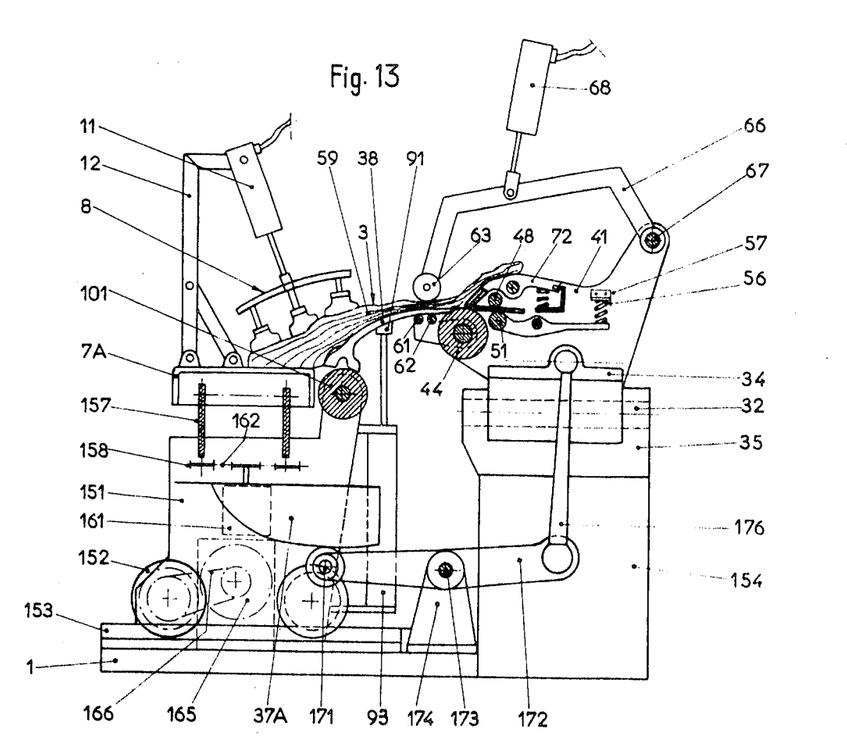
FIG. 13 is a side view of another embodiment of the machine.

In FIG. 13, there has been shown an alternative construction of the machine which differs from the embodiment of FIG. 1 only in the manner in which the relative movement is obtained between the table 7A which carries the meat quarter and the support plate 34 which carries the set of tools. In this alternative form, the same components as those of the machine of FIGS. 1 to 4 are designated by the same reference numerals.

The table 7A is carried by a movable frame 151 fitted with wheels 152 placed on rails 153 so that the said frame can either move towards or away from a stationary frame 154 which carries the tools and which is rigidly fixed to the base-plate 1.

The table 7A is supported near its four corners by means of four vertical screws respectively such as the screw 157 which are engaged in nuts such as 158. The said nuts are rotatably mounted in the frame 151 and can be driven, for example, from a reduction-gear electric motor 161 by means of any suitable drive mechanism such as a chain drive system as shown diagrammatically at 162.

The displacement of the frame 151 along the rails 153 is carried out by means of a reduction-gear motor 165 which is mounted in the said frame and coupled to the wheels 152 by means of a chain-drive system 166, for example.

The sliding rotary cutter 101 is rotatably mounted in the top portion of the movable frame 151 and cutting of the backbone is carried out as a result of a downward movement of the table 7A on which the meat quarter is fixed. The jacks such as the jack 93 for supporting the serrated cross-member 91 on which the quarter is supported are also carried by the movable frame 151.

The cam 37A whose position is reversed with respect to the position of the cam 37 shown in the embodiment of FIGS. 1 to 4 is rigidly fixed to the moving frame 151 and is adapted to cooperate with a follower-wheel 171 mounted on one extremity of a two-arm lever 172 which is pivoted at an intermediate point of its length on a stationary pin 173 carried by a bracket 174 which is fixed on the base-plate 1 whilst the other extremity of the said lever is coupled to the support plate 34 by means of a knuckle-joint connecting-arm or rod 176, the horizontal pivot-pin 32 of the said support plate being mounted in the top portion of the stationary frame 154.

The operation of this machine is the same as that of the machine shown in FIGS. 1 to 4 in view of the fact that, progressively as the table 7A which supports the meat quarter moves towards the tool-support plate 34, the said plate performs a downward pivotal movement under the control of the cam 37A and of the system of levers, with the result that the set of tools and especially of spatulas closely follows the configuration of the ribs.

FIG. 14 shows diagrammatically another form of construction of a spatula 71 which is adapted to slide within a guide 181 under the action of a cam 182 which is carried by a rotary shaft 183 and against which the said spatula is applied by a spring 184.

In another alternative form of construction which is illustrated in FIG. 15, the spatula 71 is adapted to slide within the guide 191 under the action of a control system which comprises a link-arm 192, the lower end of which is pivotally coupled to the sliding spatula 71 whilst the upper end thereof is mounted on the sleeve of an eccentric 193 which is rigidly fixed to a rotary shaft 194.

Figure 16:
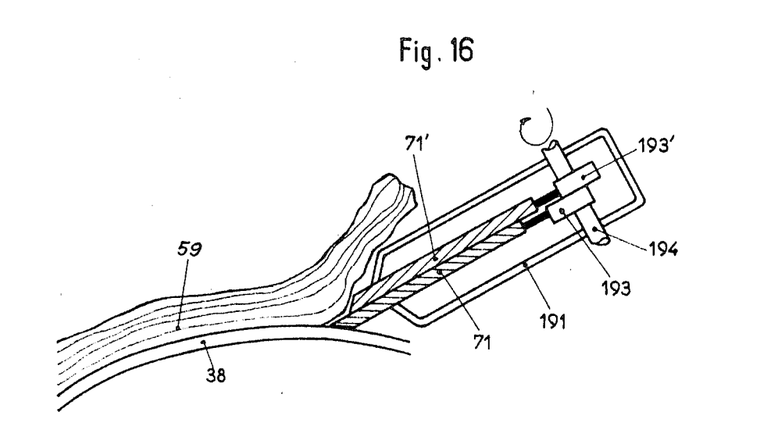

FIG. 16 shows an alternative form with two superposed spatulas 71, 71', the to-and-fro sliding movements of which within the guide 191 are carried out in opposite relative displacement by means of a system comprising two eccentrics such as 193, 193' which are carried by the rotary shaft 194, and which may be staggered angularly by 180° as regards maximum or minimum throw. The upper spatula 71' assists the detachment of the meat 59 from the ribs 38.

Figure 17:
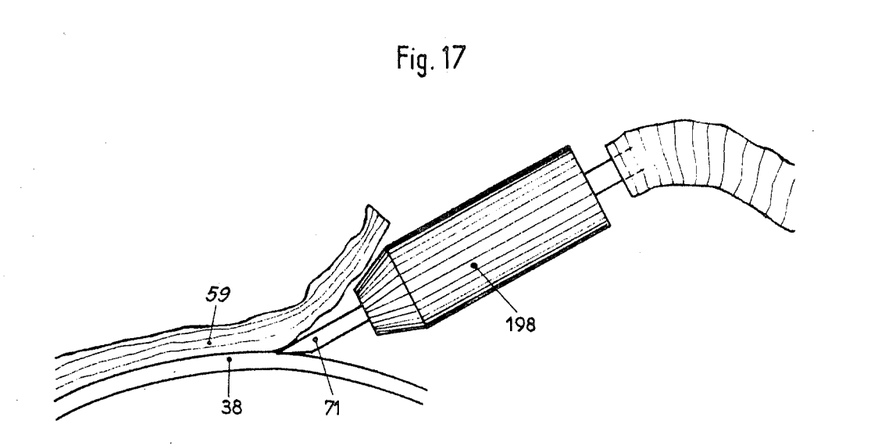

FIG. 17 shows another alternative form in which the spatula 71 is mounted in a pneumatic unit 198 (not shown in detail) which imparts the desired periodic movement thereto.

Figure 22:
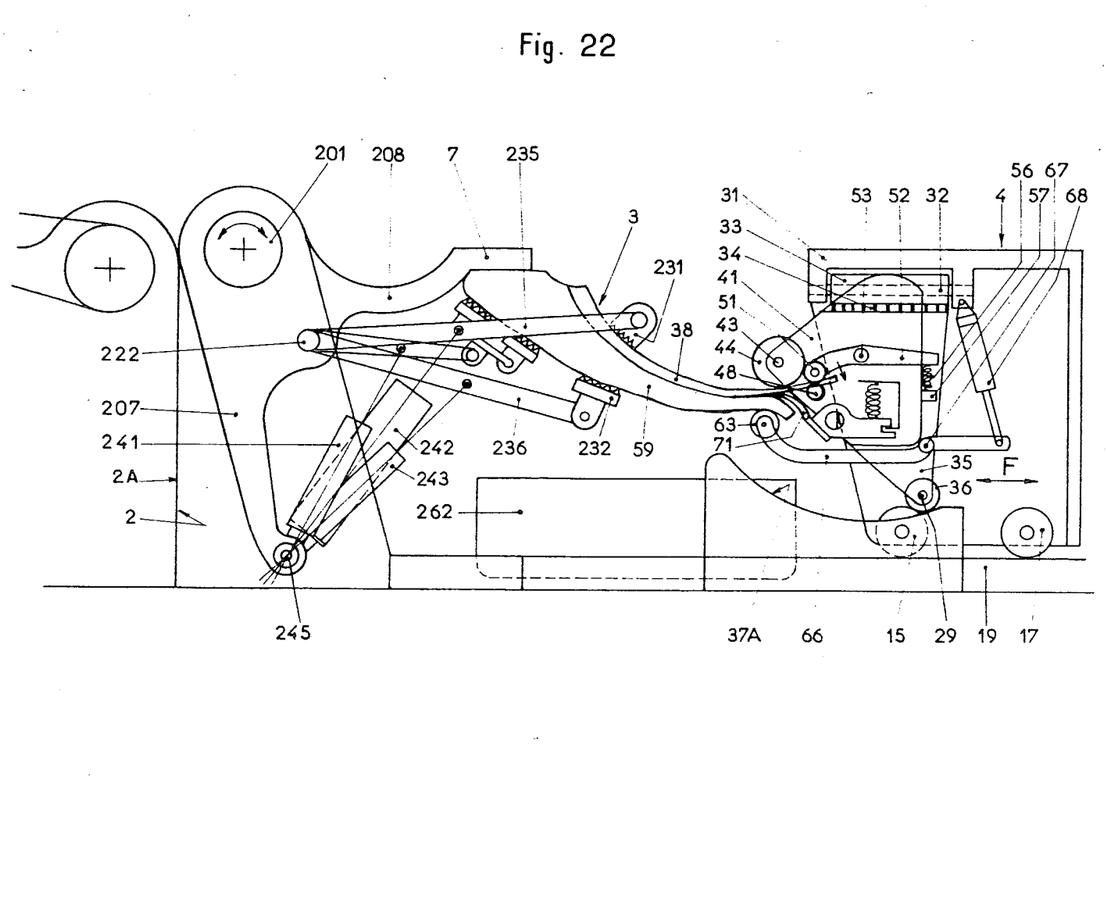
FIG. 22 is a profile view of the rear section of the machine in the second stage of boning stage proper.

The machine for boning the forequarters of butcher's meat which is shown as a whole in FIG. 18 and FIG. 22 comprises in the same manner as the machines hereinabove described a frame 2 for supporting a horizontal rotary cutter 101 for removing the backbone 9 from a meat quarter 3, a frame 4 which is adapted to support the bonding tools 71 and a table 7 for supporting the meat quarter.

The machine under consideration bears a close relation to the embodiment which is illustrated in FIG. 1 and the same reference numerals have been retained in order to designate corresponding elements. However, this form of construction differs in respect of a certain number of features. In the first place, the table 7 on which the meat quarter 3 is fixed does not form part of the frame 2 but is pivotally mounted on a horizontal shaft 201 carried by the upper portion of a frame 2A constructed in this example in the form of two bearing end-plastes 203, 204 (see also FIG. 19) which rest either on the ground or on a base-plate. To this end, the table 7 is secured at both ends with two arms 208 which are rigidly fixed to the shaft 201.

A further important difference lies in the fact that the complete mechanism which carries the boning tools 71 is mounted on the frame 4 upside down with respect to the tool-holding unit of the machine which is shown in FIG. 1 since the meat quarter to be boned is in turn presented upside down. In this case, the rib concavity is accordingly directed upwards, with the result that the cam 37A which determines the vertical component of the tool movement is also endowed with an upwardly directed concavity whereas, in the machine of FIG. 1, the top surface of the corresponding cam would have a convex configuration.

Moreover, the sliding rotary cutter 101 for removing the backbone is located at the extreme forward end of the machine for reason of convenience of construction whereas, in the machine of FIG. 1, the same cutter was located at the rear end of the front supporting frame 2.

Figures 20, 20A:
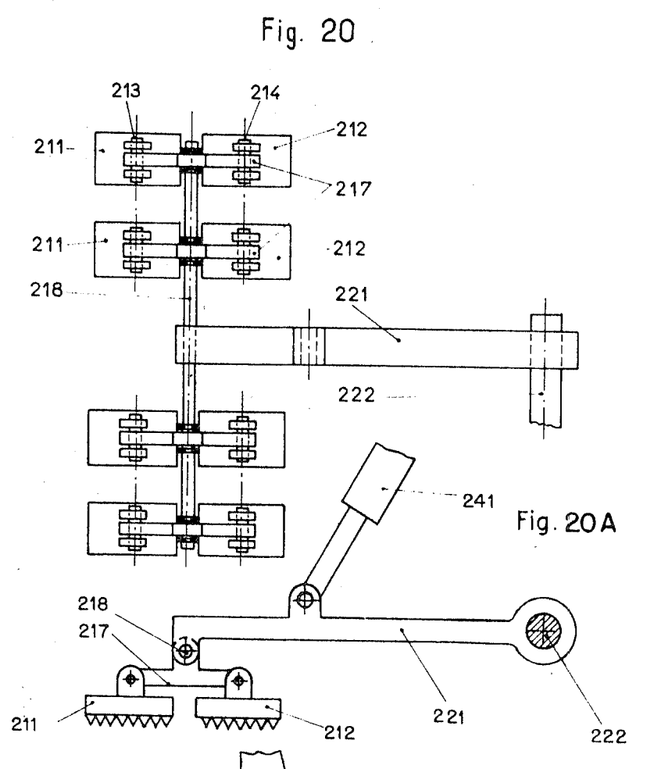
FIGS. 20 and 20A are views on a larger scale, respectively in plan and in profile, showing the detail of a part of the means for clamping the meat quarter on the table.

Clamping of the meat quarter 3 on the table 7 is carried out by an assembly of pairs of serrated shoes 211, 212 (as also shown in FIG. 20 and FIG. 20A) which are pivoted by means of pins 213, 214 on the two extremities of a rocker-arm 217 which is pivotally mounted at the mid-point thereof on a horizontal trasverse rod 218 carried by arms 221 which are in turn pivotally mounted on a shaft 222 carried by two arms 206 and 207 which are also rigidly fixed to the shaft 201.

That portion of the meat quarter 3 which projects beyond or overhangs the table 7 is supported by a serrated cross-member 231 for supporting the meat ribs and a clamping cross-member 232, the said cross-members being supported respectively at the two extremities thereof by means of arms such as 235, 236 which are also pivotally mounted on the shaft 222.

The arms 221 which serve to apply the clamping shoes against the meat quarter, the cross-member 231 for supporting the meat ribs and the clamping cross-member 232 are actuated respectively by jacks 241, 242 and 243, the cylinder-ends of which are pivotally coupled to a cross-member 245 which provides a connection between the extremities of the two arms 206 and 207.

Figure 18:
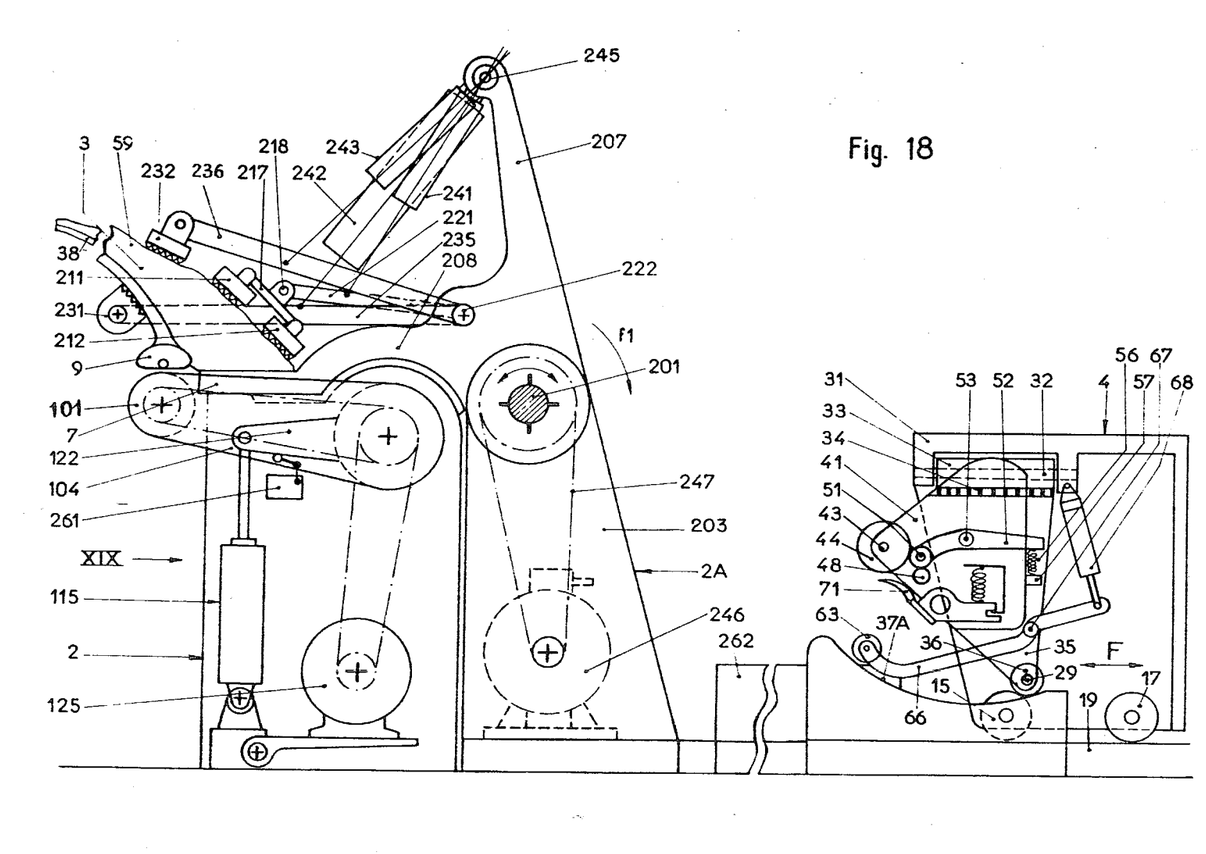
FIG. 18 is a fragmentary side view of another embodiment of a machine in the position of execution of the first stage of removal of the backbone from a meat forequarter.
Figure 19:
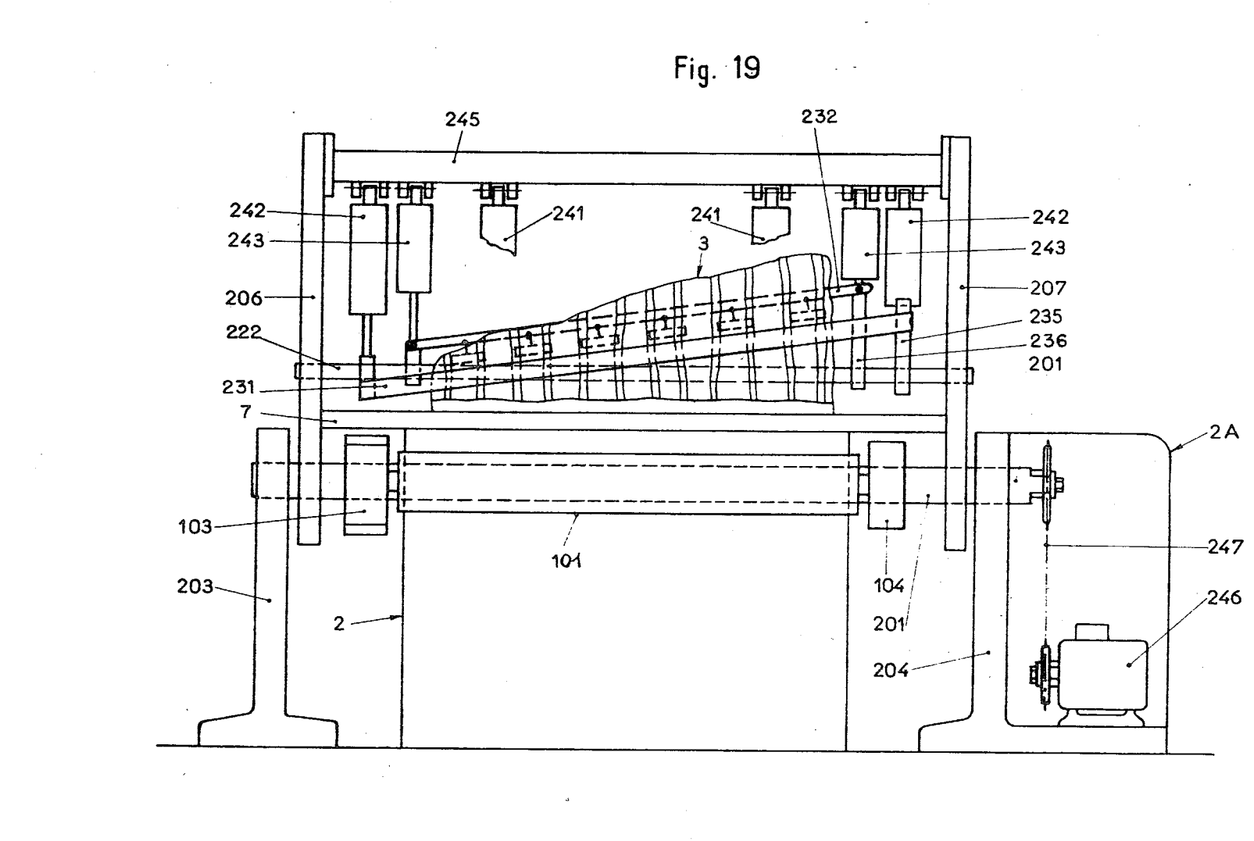
FIG. 19 is a corresponding front view looking in the direction of the arrow XIX of FIG. 18.

The shaft 201 which supports the table is capable of rotating alternately in one direction and in the other by one half-revolution under the action of a suitable drive system of the type shown, for example, in FIGS. 18 and 19 in the form of a reversible electric brake motor 246 which is coupled to the shaft 201 by means of a chain-drive 247, and which is suitably controlled by an appropriate electric circuit of any conventional type.

Figure 21:
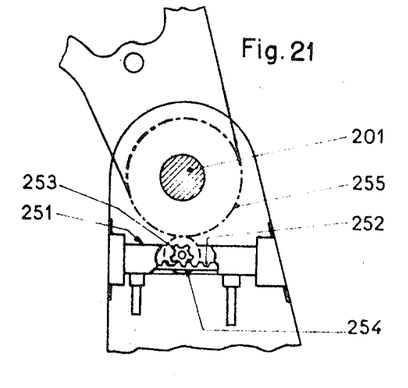
FIGS. 21 is a side view of an alternative form of the device for controlling the reversal of the meat quarter.

By way of alternative, there is shown in FIG. 21 a pneumatic drive system which comprises a double-acting jack 251 which actuates a rack 252, the said rack being in mesh with a pinion 253 which is rigidly coupled with a gear 254 in meshing relation with another gear 255 fixed on the shaft 201. Depending on the direction in which the jack 251 is supplied, the rack moves either in one direction or in the other and consequently causes the shaft 201 to pivot in the corresponding direction.

The operation of the machine is as follows:

The table 7 rests on top of the frame 2 which carries the slyiding rotary cutter 101; the meat quarter 3 is placed thereon in a position such that the backbone 9 is located immediately above the cutter. By means of the jacks 242, the cross-member 231 is moved into a suitable position for supporting the ribs 38. The quater is clamped on the table by means of the clamping shoes 211, 212 by supplying the corresponding jacks 241 and the gripping action is completed by applying the clamping cross-member 232 which presses on the meat 59 under the action of the jacks 243.

By means of the jack 115, the sliding rotary cutter which is driven in rotation by the electric motor 125 is caused to move upwards until the backbone 9 has been completely eroded and thus removed.

The sliding rotary cutter is then returned downwards by reversing the direction of supply of compressed air to the jack 115; the arm 122 actuates a limit switch 261 which controls a suitable electric circuit for supplying the electric motor 246 in the direction which initiates the pivotal motion of the shaft 201 through an angle of approximately 180° as indicated by the arrow $f1$. The meat quarter is therefore reversed and takes up the position shown in FIG. 22. The jack 68 is actuated so as to produce the upward motion of the roller 63 which supports the corresponding edge of the quarter and applies the ends of the meat ribs against the rib-milling cutter 44. The frame 4 which carries the tools is moved forward in such a manner as to ensure that the ends of the ribs engage between the stripping rollers 48 and 51 while the spatulas 71 detach the meat which drops under gravity into a receiving vessel 262 which is provided for this purpose between the rails such as the rail 19. The spatulas work in the same manner as in the machine which is illustrated in FIG. 1 except that the complete mechanism for detaching the meat is placed upside down as mentioned earlier.

When the operation is well under way, the cross-member 231 which supports the ribs and the clamping cross-member 232 withdraw respectively upwards and downwards under the action of their control jacks which are suitably supplied in an automatic manner, with the result that, during the forward motion of the moving frame 4, the rib-milling cutter 44 does not encounter any obstacles and can reach the zone of the quarter in which the removed backbone was located.

As is readily apparent, the invention is not limited to the forms of construction herein described and illustrated and a large number of modifications can accordingly be contemplated without thereby departing either from the scope or the spirit of the invention.

What I claim is:

1. In a machine for boning butcher's meat, of the type comprising support means for fixing the meat to be boned and a thin-edged tool movable with respect to said support, at least in the longitudinal direction of the bones, to engage between the bones and the meat in order to separate meat from the bones, the improvement including the combination of: a tool support; a plurality of aligned elongated spatulas mounted on said support each having a bevelled front extremity which is not a cutting edge; spatula actuating means imparting to each of said spatulas longitudinal reciprocating movement; a pair of superposed horizontal rollers mounted adjacent said tool support for stripping the bones in the vicinity of the extremities of said spatulas; the meat support and the tool support mounted in adjacent relation to each other and being provided with means for relative displacement both in the horizontal direction and vertical direction as the tools follow the longitudinal curvature of the bones.

2. A machine in accordance with claim 1, characterized in that the meat support and the tool support are carried by a base-plate, one support being mounted in such a manner as to be capable of horizontal displacement on the said base-plate either towards or away from the other support and the said other support being mounted in such a manner as to be capable of vertical displacement with respect to the said base-plate.

3. A machine in accordance with claim 1, characterized in that the means for actuating the spatulas are such that the movement of each spatula is out of step with respect to the movements of the adjacent spatulas.

4. A machine in accordance with claim 1, characterized in that the said machine additionally comprises a rotary cutter disposed along the meat support.

5. A machine in accordance with claim 4, characterized in that the rotary cutter is provided with means adapted to impart axial reciprocating movement thereto.

6. A machine in accordance with claim 4, characterized in that the rotary cutter is downwardly retractable.

7. A machine in accordance with claim 1, characterized in that the alignment of the front extremities of the spatulus is horizontally and vertically inclined with respect to the rear edge of the meat support.

8. A machine in accordance with claim 1, characterized in that the said machine additionally comprises a retractable cross-member disposed between the meat support and the spatulas in order to support said meat temporarily.

9. A machine in accordance with claim 1, characterized in that said machine additionally comprises a rotary cutter disposed along the meat support; and means fixing the meat and capable of separate positions, namely: a first position of presentation of the backbone to the rotary cutter so as to effect the removal thereof with the ribs located on the underside and a second position of presentation of the meat to stripping rollers and boning spatulas with the ribs located uppermost.

10. A machine in accordance with claim 1, characterized in that the support for the meat comprises a table and in addition a system for clamping the meat on said table, a cross-member for supporting the ribs and a clamping cross-member so arranged that a portion of a meat which is located in overhung position beyond the said table is clamped between the said cross-members.

11. A machine in accordance with claim 1, wherein one of said meat and tool supports is stationary while the other is capable of horizontal displacement towards and away from said one support and also capable of verticle displacement.

12. A machine in accordance with claim 1, wherein one of said meat and tool supports is capable of horizontal displacement towards and away from the other support, while said other support is capable of vertical displacement.

13. A machine in accordance with claim 1, wherein one of said meat and tool supports is pivotally mounted on a horizontal axis, thus enabling said vertical relative movement between said two supports.

14. A machine in accordance with claim 11, further comprising a stationary first frame and a second frame horizontally movable towards and away from said first frame, said meat support being carried by said first frame and said tool support pivotally mounted on an horizontal axis on said second frame.

15. A machine in accordance with claim 1, wherein only one of said meat and tool supports is vertically movable, the machine further comprising two control elements, one of said control elements being a cam and the other a cam follower engaged with said cam, one of said two control elements being operatively connected to the vertically movable support.

16. A machine in accordance with claim 15, further comprising a frame, said cam follower being carried by said vertically movable support while said cam is rigidly secured to said frame.

17. A machine in accordance with claim 15, further comprising a frame, and a pin caried by said vertically movable support, said cam follower comprising a roller rotatably mounted on said pin and said cam being rigidly secured to said frame.

18. A machine in accordance with claim 15, further comprising a stationary frame, a frame movable horizontally, and a system of levers carried by said stationary frame, said support fixed horizontally and said cam being carried by said horizontally movable frame, said vertically movable support being carried by said stationary frame, and said cam follower and vertically movable support being operatively connected by said system of levers.

19. A machine in accordance with claim 18, wherein said system of levers comprises a lever pivotally mounted on said stationary frame and a connecting rod, said cam follower being carried by said pivoting lever, and said connecting rod operatively connecting said lever and said vertically movable support.

20. A machine in accordance with claim 1, further comprising a table adjustable for height on said meat support and adapted to receive the meat.

21. A machine in accordance with claim 1, wherein said meat support is provided with a meat clamping system.

22. A machine in accordance with claim 1, wherein each spatula has a transverse movement in which the tip of the spatula describes a curve with an active portion and an inactive return portion, said active portion extending both forwardly and vertically while said inactive portion extends backwardly and vertically.

23. A machine in accordance with claim 3, further comprising: a spatula actuating rotary shaft, a plurality of eccentrics secured beside one another on said shaft in relatively displaced angular positions, the number of said eccentrics being equal to the number of said spatulas, a plurality of levers equal in number to the number of spatulas and subjected to the action of corresponding eccentrics, said spatulas being secured to the respective levers.

24. A machine in accordance with claim 23, wherein said accentrics comprise eccentric rings each provided with a key groove, the grooves of the different ringe being adapted to assume different angular positions with respect to their displaced centres, said spatula actuating rotary shaft having a key, and the grooves of the different rings being engaged over said key.

25. A machine in accordance with claim 23, wherein sadi eccentrics comprise eccentric rings each provided with female splines, said spatula actuating rotary shaft having mating male splines, said eccentric rings being mounted on said shaft with their splines engaged with said splines of said shaft and angularly displaced each with respect to the next.

26. A machine in accordance with claim 23, wherein each spatula carrying lever is mounted on said eccentric at an intermediate point of its length, the respective spatula being secured on one end of said lever, the opposite end of said lever being in the shape of a fork having two prongs located one above the other, the machine further comprising a guide secured to said tool support and engaged between the two prongs of each of said forks with clearance, each spatula carrying lever being biased so as to take up said clearance in the direction which tends to make said front extremity of said each spatula apply against the bones of the meat.

27. A machine in accordance with claim 1, wherein said spatulas are of substantially rectangular cross-section and the edges of their contiguous engaged faces are sharp edges which work in the manner of a pair of scissors in order to cut the nerve fibres.

28. A machine in accordance with claim 1, wherein one of said bone stripping rollers is mounted in fixed position on said tool support while the other is biased toward said one roller.

29. A machine in accordance with claim 1, wherein one of said bone stripping rollers is mounted in fixed position on said tool support while the other is biased toward said one roller, the machine further comprising a rotary rib-milling cutter placed immediately in front of said biased bone stripping roller.

30. A machine in accordance with claim 1, further comprising a plurality of guides secured at an oblique angle on said tool support, the number of said guides being equal to the number of said spatulas, and each spatula being mounted for longitudinal sliding movement within the respective guide.

31. A machine according to claim 30, wherein said spatula actuating means comprise a rotary spatula actuating shaft and cams secured on said shaft, the extremity of each of said spatulas remote from its front extremity being engaged with the respective cam.

32. A machine in accordance with claim 30, wherein said spatula actuating means comprise a rotary spatula-actuating shaft, eccentrics secured to said shaft, and link arms respectively operatively connecting said eccentrics to the extremities of said spatulas remote from their front extremities.

33. A machine in accordance with claim 30, wherein said spatula-actuating means comprise pneumatic devices respectively operatively connected to said spatulas.

34. A machine according to claim 9, wherein said meat support is mounted for swinging movement about a horizontal axis parallel with said rotary cutter for removal of the backbone and is located between said rotary cutter and said boning spatulas.

References Cited

UNITED STATES PATENTS

| | | | |
|---|---|---|---|
| 3,177,520 | 4/1965 | Vogt et al. | 17—1 |
| 3,177,521 | 4/1965 | Vogt et al. | 17—1 |
| 3,268,947 | 8/1966 | Aubert | 17—1(.5) |

FOREIGN PATENTS

| | | | |
|---|---|---|---|
| 1,330,600 | 5/1963 | France | 17—1.5 |
| 130,361 | 10/1960 | Russia | 17—1.5 |

LUCIE H. LAUDENSLAGER, Primary Examiner

U.S. Cl. X.R.

146—130